USO11472269B1

(12) United States Patent
Quinn

(10) Patent No.: US 11,472,269 B1
(45) Date of Patent: Oct. 18, 2022

(54) VEHICLE WINDOW SCREEN

(71) Applicant: Larhonda Quinn, New York, NY (US)

(72) Inventor: Larhonda Quinn, New York, NY (US)

( * ) Notice: Subject to any disclaimer, the term of this patent is extended or adjusted under 35 U.S.C. 154(b) by 127 days.

(21) Appl. No.: 16/922,943

(22) Filed: Jul. 7, 2020

Related U.S. Application Data

(63) Continuation-in-part of application No. 15/689,037, filed on Aug. 29, 2017, now abandoned.

(51) Int. Cl.
*B60J 1/20* (2006.01)

(52) U.S. Cl.
CPC ........... *B60J 1/2019* (2013.01); *B60J 1/2016* (2013.01); *B60J 1/2038* (2013.01); *B60J 1/2047* (2013.01); *B60J 1/2052* (2013.01); *B60J 1/2063* (2013.01); *B60J 1/2086* (2013.01)

(58) Field of Classification Search
CPC ...... B60J 1/2019; B60J 1/2038; B60J 1/2063; B60J 1/2066; B60J 1/2086; B60J 1/2052; B60J 1/2016; B60J 1/2013; B60J 1/2044; B60J 1/2047; B60J 1/2069; B60J 1/2083
See application file for complete search history.

(56) References Cited

U.S. PATENT DOCUMENTS

| | | | | | |
|---|---|---|---|---|---|
| 4,874,026 | A | * | 10/1989 | Worrall | B60J 1/2072 160/310 |
| 5,860,466 | A | * | 1/1999 | Kao | B60J 1/2088 160/370.22 |
| 6,086,133 | A | * | 7/2000 | Alonso | B60J 1/2058 296/141 |
| 6,347,825 | B2 | * | 2/2002 | Seel | B60J 1/2044 296/97.4 |
| 6,910,518 | B2 | * | 6/2005 | Zimmermann | B60J 1/2069 160/370.21 |
| 7,125,064 | B1 | * | 10/2006 | Sien | B60J 1/2077 160/370.22 |
| 7,347,246 | B2 | * | 3/2008 | Ayran | B60J 1/2072 160/370.22 |
| 7,493,933 | B2 | * | 2/2009 | Li | B60J 1/2075 160/310 |

(Continued)

FOREIGN PATENT DOCUMENTS

| | | | | | |
|---|---|---|---|---|---|
| CN | 103317997 | A | * | 9/2013 | ............ B60J 1/2033 |
| DE | 10245901 | A1 | * | 4/2004 | ............ B60J 1/2022 |

(Continued)

*Primary Examiner* — Johnnie A. Shablack
(74) *Attorney, Agent, or Firm* — Meunier Carlin & Curfman LLC

(57) ABSTRACT

An improved retractable screen and doorframe assembly for a vehicle is presented. The novel construction is provided wherein the window and the retractable screen reside in the housing of a vehicle doorframe once the retractable screen and window are deployed. A plurality of axially connected wheel sets residing within an inner frame track facilitates the frictionless movement of the retractable screen in a horizontal direction and secures movement of the same as it is recoiled in a backward disposition onto the screen storage reel of a screen cartridge. Forward movement is further facilitated with a positive magnetic border that quickly advances with positive magnetic force towards the doorframe assembly having a negative magnetic rod being provided therein.

9 Claims, 8 Drawing Sheets

(56) References Cited

U.S. PATENT DOCUMENTS

| | | | | |
|---|---|---|---|---|
| 7,503,374 B2* | 3/2009 | Takeuchi | | B60J 1/2027 160/370.21 |
| 7,793,702 B2* | 9/2010 | Biewer | | B60J 7/0007 296/214 |
| 7,828,040 B2* | 11/2010 | Miyachi | | B60J 1/2069 160/122 |
| 7,857,035 B2* | 12/2010 | Miyachi | | B60J 1/2027 160/265 |
| 7,934,764 B2* | 5/2011 | Hansen | | B60J 1/2072 160/370.22 |
| 8,033,313 B2* | 10/2011 | Hansen | | B60J 1/2033 160/310 |
| 8,590,959 B2* | 11/2013 | Durm | | B60J 1/2041 160/370.22 |
| 8,939,189 B2* | 1/2015 | Ojima | | B60J 1/2083 160/370.22 |
| 9,079,479 B2* | 7/2015 | Chen | | B60J 1/2077 |
| 9,126,473 B2* | 9/2015 | Ojima | | B60J 1/2013 |
| 10,773,573 B1* | 9/2020 | Eatherly | | B60J 1/2077 |
| 11,148,509 B2* | 10/2021 | Carmona | | B60J 1/2019 |
| 11,203,290 B2* | 12/2021 | Ito | | B60Q 3/74 |
| 11,230,173 B2* | 1/2022 | Stickles | | B60J 7/1657 |
| 2008/0223534 A1* | 9/2008 | Hansen | | B60J 1/2086 160/370.22 |
| 2012/0145339 A1* | 6/2012 | Mason | | B60J 1/2086 160/370.21 |
| 2012/0193044 A1* | 8/2012 | Ojima | | B60J 1/2083 160/370.22 |
| 2021/0252952 A1* | 8/2021 | Iriate | | B60J 1/2019 |
| 2022/0009321 A1* | 1/2022 | Kim | | B60J 1/2052 |

FOREIGN PATENT DOCUMENTS

| | | | | |
|---|---|---|---|---|
| DE | 202007008186 U1 * | 10/2007 | | B60J 1/2022 |
| DE | 202007016322 U1 * | 2/2008 | | B60J 1/2027 |
| DE | 202007006397 U1 * | 10/2008 | | B60J 1/2027 |
| DE | 102007045604 B3 * | 1/2009 | | B60J 1/2025 |
| DE | 102007051617 A1 * | 4/2009 | | B60J 1/2019 |
| DE | 102010042829 A1 * | 4/2012 | | B60J 1/2052 |
| EP | 1129871 A1 * | 9/2001 | | B60J 1/2027 |
| EP | 1849635 A1 * | 10/2007 | | B60J 1/2019 |
| EP | 3656592 B1 * | 10/2021 | | B60J 1/2044 |

* cited by examiner

FIG. 7
FIG. 8
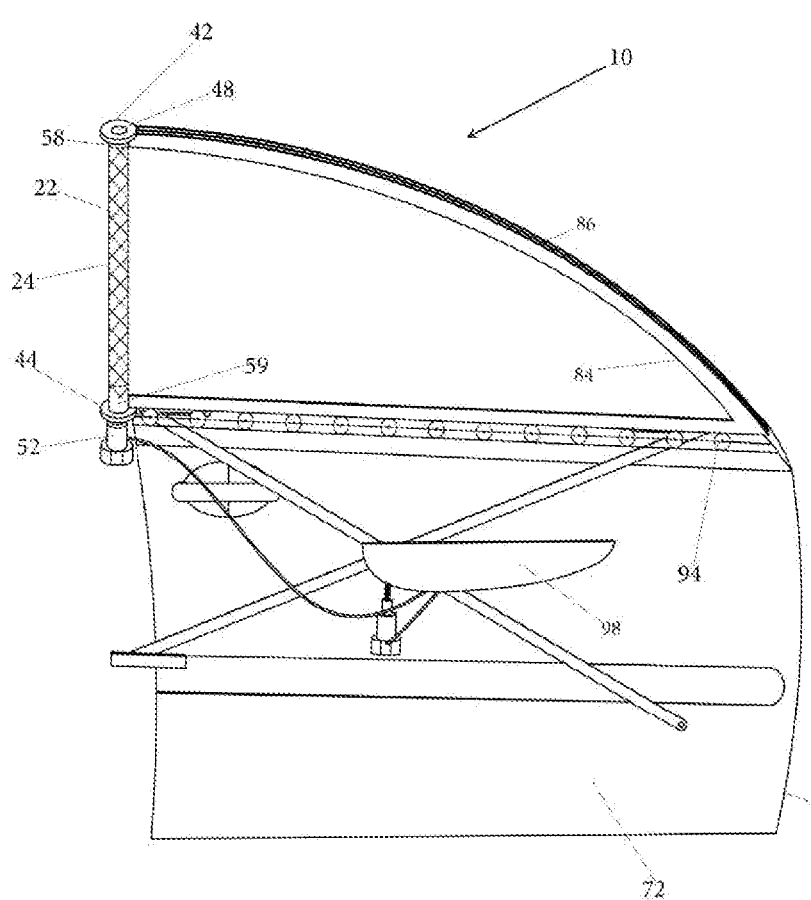
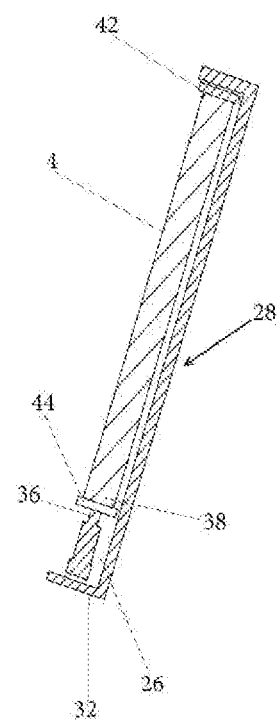

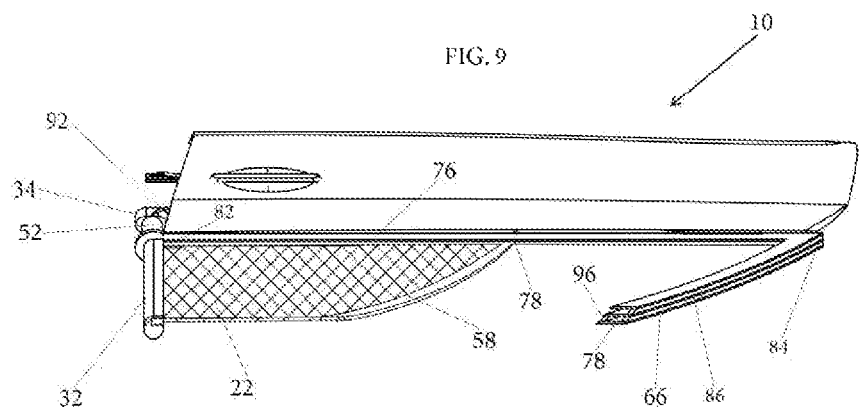
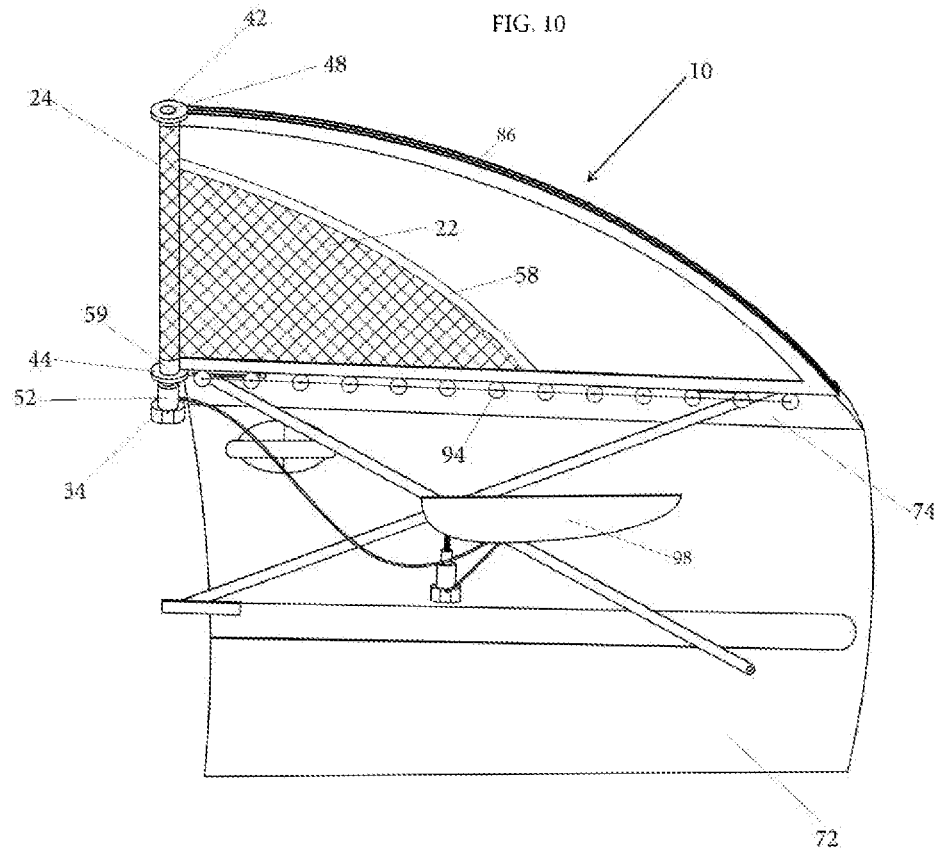

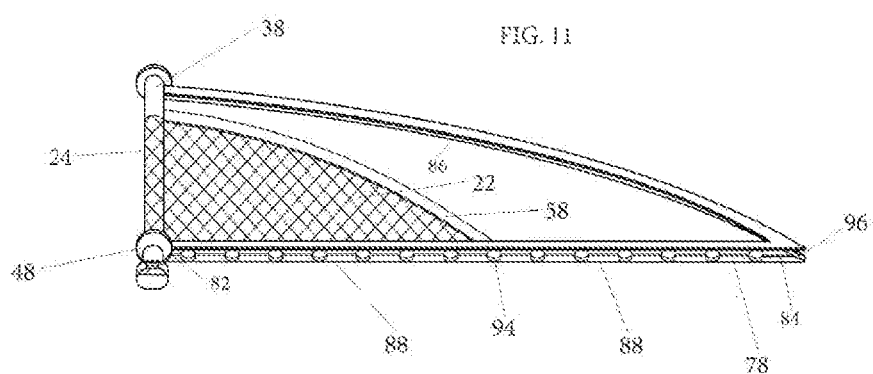

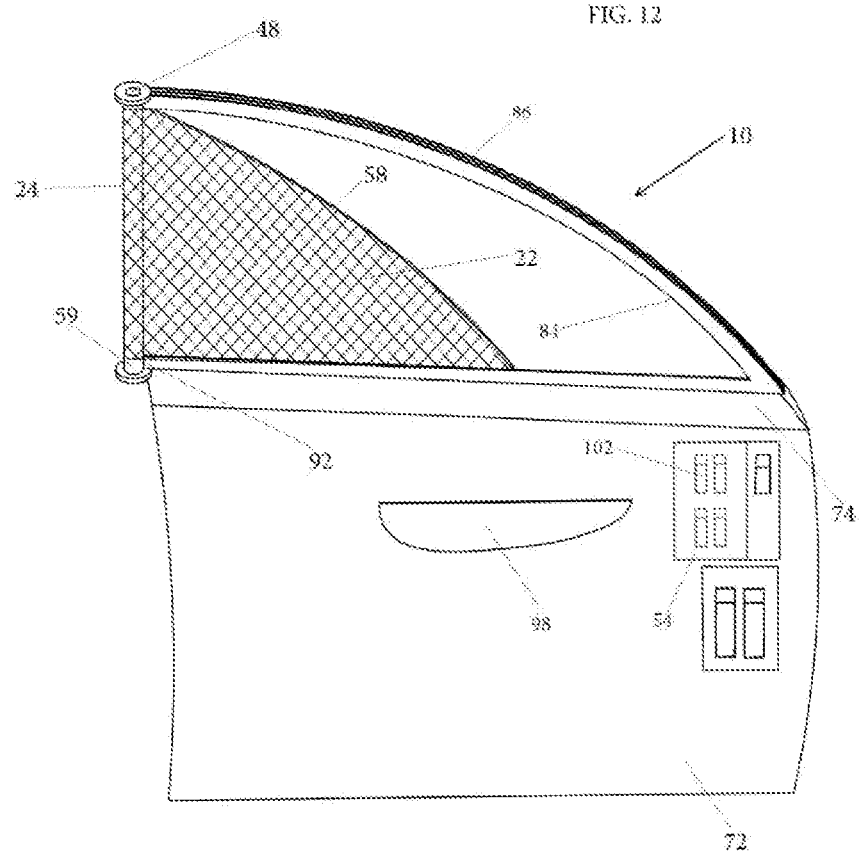
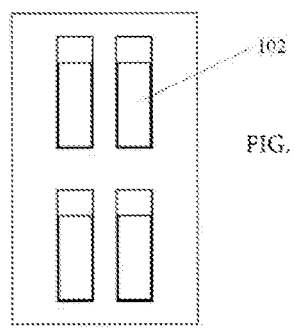

VEHICLE WINDOW SCREEN

RELATED APPLICATIONS

This application is a continuation-in-part of U.S. Utility patent application Ser. No. 15/689,037 filed Aug. 29, 2017, now pending.

FIELD OF THE INVENTION

This invention is directed to a retractable vehicle screen and doorframe assembly for a vehicle window to allow the screen to completely enclose the window portion of a moveable window in a horizontal configuration. The retractable screen is provided with a positive magnetic border that quickly advances with positive magnetic force towards a conventional doorframe assembly having a negative magnetic rod being provided therein. The invention is specifically directed to a design that enables screen material to cover the window opening of a vehicle or provide a frictionless adjustment as desired by a user.

The invention will be described with reference to a retractable screen and doorframe assembly for a vehicle wherein the screen is provided on a screen storage reel and is placed within the interior housing of a screen cartridge. The screen assembly will be particularly useful in situations where airflow is desired in the interior of a vehicle. When used properly, the screen assembly would reduce the chances of heat stroke deaths to children and pets. However, this invention should be used on a plurality of vehicle types and it should be acknowledged that limitations should not be placed on the embodiments that are provided herein.

BACKGROUND OF THE INVENTION

Rolling or retractable screen assemblies that move horizontally or vertically across an entrance opening are well known in the art. In a plurality of cases, the screen is attached or wounded around a durable retaining element and moved across an opening. It is also well know in the art to provide a retractable screen assembly that can move sideways across a window or door cavity. It is also well known that a secure placement of the screen would be required to place the screen in an extended position along the standard window opening of a vehicle. This would prevent the screen from accumulating outside of the desired areas of use. The invention as provided herein provides novel features that allow for the smooth and efficient closure of screen material across the window opening of a car. Specifically with the assembly as provided herein, the retractable screen is provided on a motorized rod that is detachably placed on the left side opening of a vehicle doorframe.

The general requirement for keeping a screen under tension in a window, door, or frame opening is also well known in the art. Most screens are placed in a tense position when they are pulled from a retracted position to an extended position. In most instances, this is achieved by adding additional mechanisms to weigh down the screen.

It is also known in the art to provide additional balancing mechanisms to improve the horizontal movement of screens. These balancing mechanisms have been produced in various arrangements and sizes to produce balance against the tension that is produced as the screen is moved.

However, retaining a screen under tension or providing additional weighted mechanisms might damage the screen or prevent a smooth horizontal movement. Another disadvantage is that the increased weight or tension can damage the screen material. This is especially true in cases where the screen material is thin or made of inferior screen material.

It is believed, however, that none of the above methods of retracting or extending a screen within a window or door opening describe the retractable vehicle screen of the present invention. Developing a retractable vehicle screen that allows the user to open or close a screen within the doorframe of a car is therefore an unmet need in the art. The retractable vehicle screen as prescribed herein is connected to a reel motor which allows the bottom portion of the screen to move smoothly within an inner frame track. Movement of the screen is further facilitated by a plurality of axially connected wheel sets that are provided within the bottom portion of the track.

After submitting the vehicle window screen with parallel functionality to the patent office and the functionality being rejected, I imagined a new and improved way that the vehicle window screen would function. The screen would sit in a cylinder casing and would sit in the frame of the door or roof of a car. It would have a flexible but secure border. It would work on a horizontal guided tract and would clasp into a secure grip when fully activated. There would be a master control switch on the driver's side and another control switch at each of the other passenger sides of a vehicle. The screen would move by a motor and would be moved along horizontally with wheels and interlocking teeth guiding the screen until it is securely closed. With magnetic trim to help secure the screen or other ways to help it stay secure.

BRIEF SUMMARY OF THE INVENTION

It is an advantage of the present invention to provide an improved retractable screen and doorframe assembly for a vehicle comprising a retractable screen being releasably placed on a screen storage reel and being placed within the interior housing of a screen cartridge having an exterior cover and a reel-mounting hub.

It is an additional advantage of the present invention to provide an improved retractable screen and doorframe assembly for a vehicle having a screen storage reel being provided with a drum portion, a first opposing disc, and a second opposing disc being secured to either side of said drum portion and each of the first opposing disc and the second opposing disc having outer ends with apertures being provided therein, the screen storage reel being unitarily insertable in the interior housing of the screen cartridge and being removable therefrom.

It is an additional advantage of the present invention to provide an improved retractable screen and doorframe assembly for a vehicle having a reel-mounting hub featuring a reel motor being electrically connected to a conventional window and screen closure mechanism rotating a screen storage reel wheel in forward and backward rotational directions.

It is still an additional advantage of the present invention to provide an improved retractable screen and doorframe assembly for a vehicle wherein the retractable screen is constructed from screen material and having a rigid upper edge with a positive magnetic border 58 being attached thereon.

It is still an additional advantage of the present invention to provide an improved retractable screen and doorframe having an inner frame with a wheel and wire assembly that facilitates the movement of a retractable screen whose movement is further facilitated with an increased field attractive force between a positive magnetic border 58 and a negative magnetic rod 96 being provided in the vehicle doorframe.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

Additional advantages and features of the present invention will become more apparent when considered in light of the following specification and drawings.

BRIEF DESCRIPTION OF THE SEVERAL VIEWS OF THE DRAWINGS

The present embodiments are illustrated by way of the figures of the accompanying drawings, which may not necessarily be to scale, in which like references indicate similar elements, and in which:

FIG. 7 illustrates a cross sectional view of a doorframe assembly with a retractable screen in accordance with the preferred embodiments of the present invention.

FIG. 8 illustrates a cross sectional view of a screen storage reel.

FIG. 9 illustrates a top view of the inner frame track of an exemplary doorframe housing with the rotatable screen in a partially extended position.

FIG. 10 illustrates a cross sectional view of a doorframe assembly with a retractable screen in a partially extended position.

FIG. 11 illustrates a bottom cross sectional view of the inner frame track.

FIG. 12 illustrates a perspective view of an exemplary doorframe with an exemplary window and screen closure mechanism.

FIG. 13 illustrates a perspective view of an exemplary vehicle window and screen closure mechanism.

DETAILED DESCRIPTION OF THE INVENTION

Figure 1:
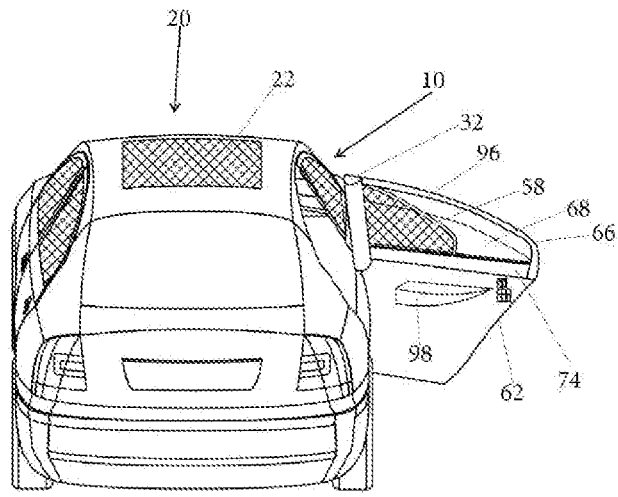
FIG. 1 illustrates an exemplary view of a vehicle with a retractable screen and doorframe assembly construction in accordance with the preferred embodiments of the present invention.
Figure 2:
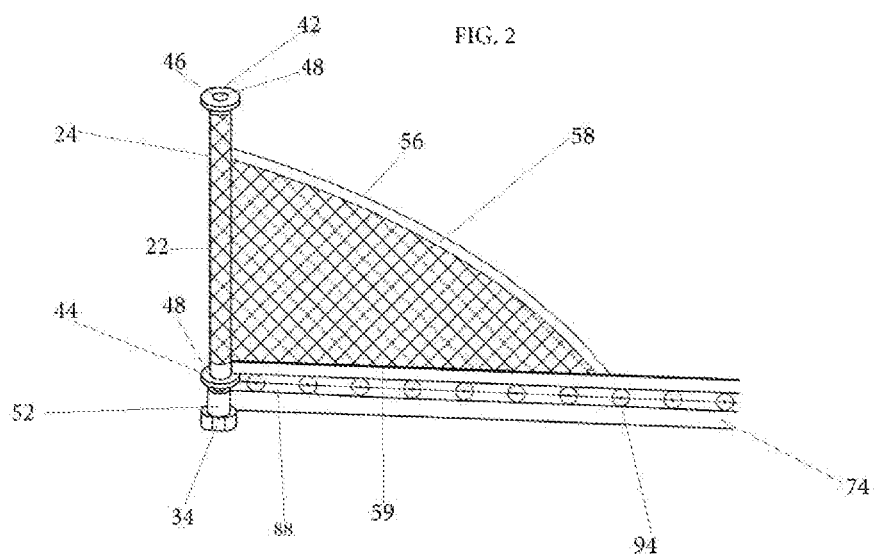
FIG. 2 illustrates a cross sectional view of the inner frame track and the rotatable screen in an approximate half extended position.
Figure 3:
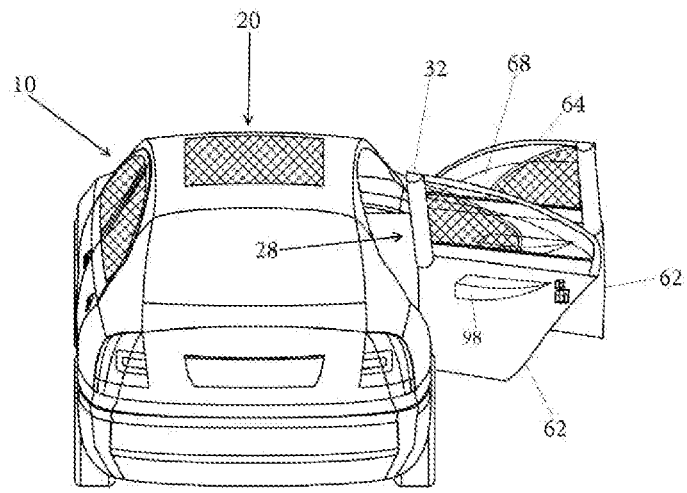
FIG. 3 illustrates the view of FIG. 1, with the rotatable screen in a partially extended position on a plurality of doorframes.
Figure 4:
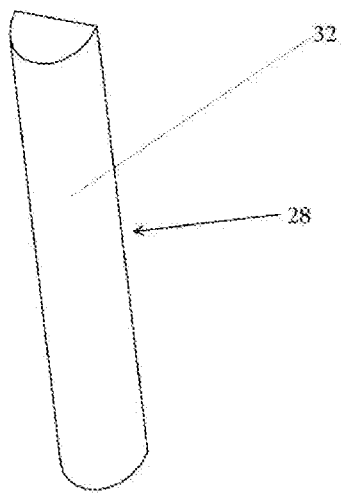
FIG. 4 illustrates an exemplary exterior cover of a screen storage reel.
Figure 5:
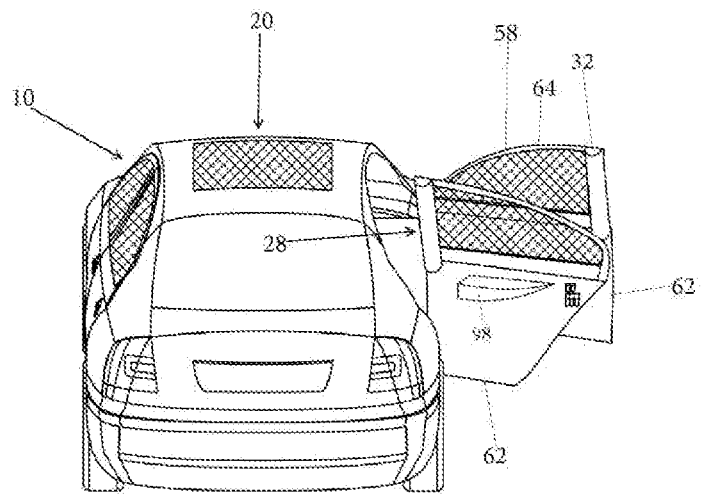
FIG. 5 illustrates the view of FIG. 1, with the rotatable screen in a fully extended position on a plurality of doorframes.
Figure 6:
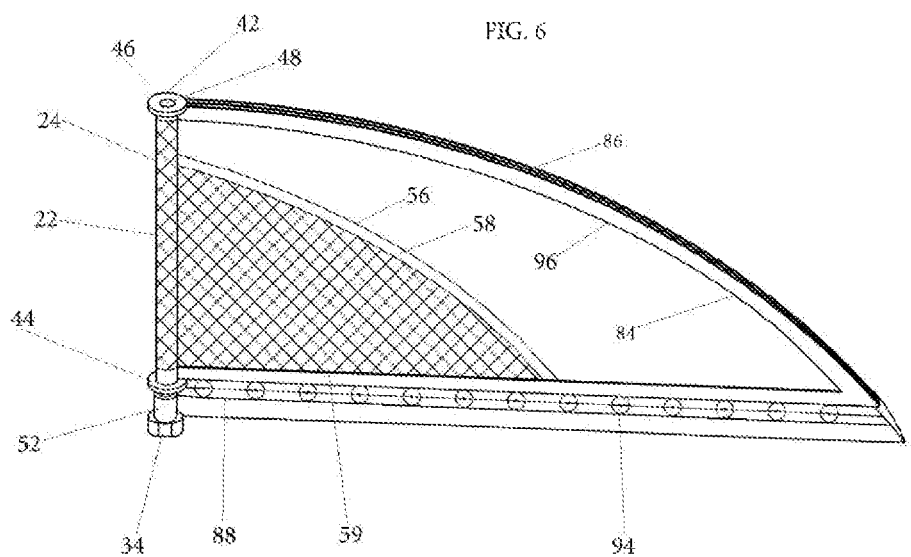
FIG. 6 illustrates a perspective view of the inner frame track of an exemplary doorframe housing with the rotatable screen in a partially extended position.
Figure 14:
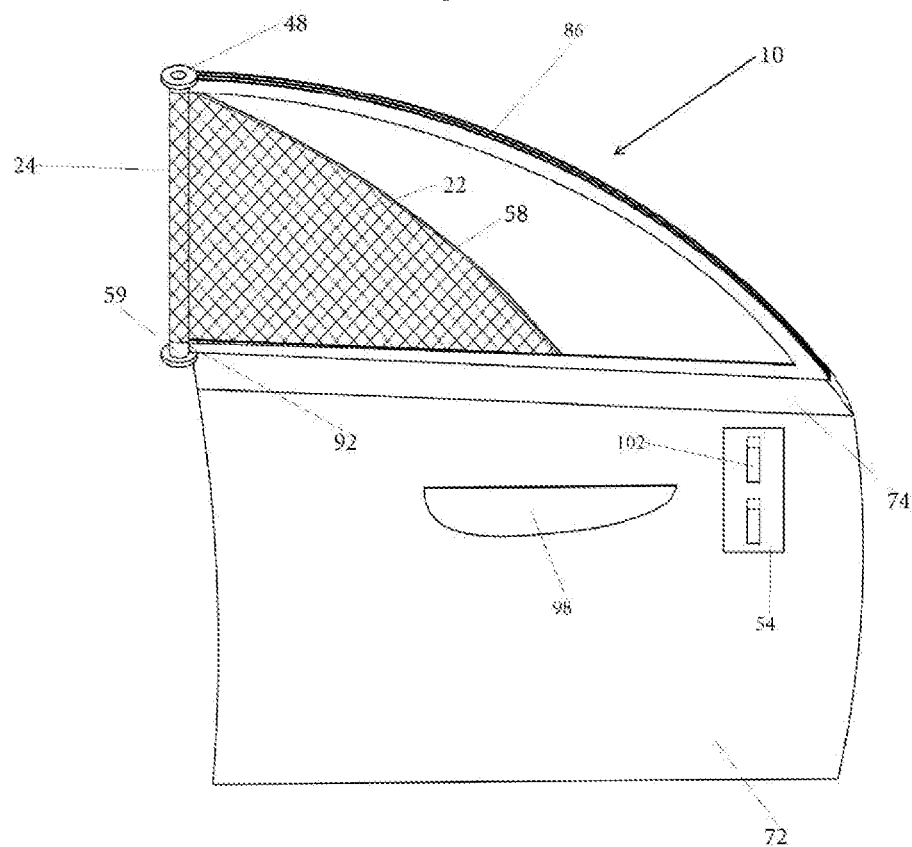
FIG. 14 illustrates a perspective view of an exemplary doorframe with window and screen closure mechanism.
Figure 15:
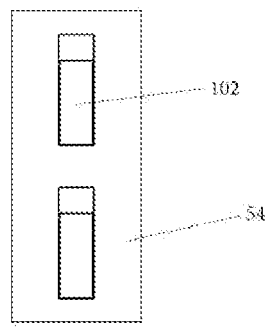
FIG. 15 illustrates a perspective view of an exemplary vehicle window closure mechanism.

An improved retractable screen and doorframe assembly 10 for a vehicle is presented. FIGS. 1-15 illustrate an exemplary type of retractable screen whereby the screen material is moved across the bottom frame of a conventional vehicle doorframe. The retractable screen 22 is releasably placed on a screen storage reel 24 and placed within the interior housing 26 of a screen cartridge 28 having an exterior cover 32 and a reel-mounting hub 34. The screen storage reel 24 is provided with a drive portion 38, a first opposing disc 42, and a second opposing disc 44 being secured to either side of the drum portion 38 and each of the first opposing disc 42 and second opposing disc 44 having outer ends 46 with apertures 48 being provided therein. The screen storage reel 24 is unitarily insertable in the interior housing of the screen cartridge 28 and is removable from the interior housing 26 of the screen cartridge 28.

The reel-mounting hub 34 features a reel motor 52 that is electrically connected to a conventional window and screen closure mechanism 54 for the vehicle. The reel-mounting hub 34 having at its top portion a freely rotatable top drive portion 36 for releasably securing the screen storage reel 24 thereto and to receive the outer ends 46 of the first opposing disc 42 and the second opposing disc 44 and whereby the reel-mounting hub 34 rotates the screen storage reel 24 in forward and backward rotational directions. The screen storage reel 24 is rotatably mounted on the reel-mounting hub 34 by snapping the first opposing disc 42 or the second opposing disc 44 into the top drive portion 36 of the reel-mounting hub 34. The reels 24 are generally adapted to be mounted on the reel-mounting hub 34 in such a fashion as to allow transfer of the screen 22 from a supply-style reel to a fully extended screen 22 with the bottom portion 59 being immediately disposed in the inner frame track 78. The reel-mounting hub 34 engages the screen storage reel 24 once said reel motor 52 is actuated by said window and screen closure mechanism 54 and said drum 38 of said screen storage reel 24 rotates.

The retractable screen 22 is constructed from screen material, includes side edges, and has a rigid upper edge 56 with a positive magnetic border 58 being attached thereon, and a bottom portion 59. The retractable screen 22 is rolled on and rolled out from the screen storage reel 24 once the window and screen closure mechanism 54 is actuated. The various types of screen material can include standard fiberglass (18×16 mesh), no-see-um fiberglass (20×20 mesh), improved visibility fiberglass screens, pet screens, solar insect screens, etc.

The doorframe 62 features a top portion 64, a bottom portion 66, a window 68 of conventional construction that is shaped to fit the vehicle 20, and a doorframe housing 72. The top portion 64 of the doorframe 62 includes a top frame 74 with a standard window opening 76 for the standard opening and closing of the window 68, and an inner frame track 78 including a left side 82 portion, a right side portion 84, a top portion 86, and a bottom portion 88.

The inner frame track 78 being provided with an opening 92 on the left side portion 82 for receiving the retractable screen 22. The inner frame track 78 is further provided with a plurality of axially connected wheel sets 94 that are dispensed inside the bottom portion 88 of the inner frame track 78 for slidably receiving and moving the bottom extension of the retractable screen 22. Guide wires can be provided centrally within the close axial connection and wherein the wheel sets 94 are suitably connected in close axial alignment for vibration as a unitary surface. The wheel sets 94 thereby engaging in vibratory movement as a unit so that the screen is horizontally conveyed across the bottom portion 88 of the inner frame track 78. Friction is reduced and the retractable screen 22 can perform the proper rolling motion from the left side portion and the bottom portion 88 of the inner frame track 78.

The inner frame track 78 having a framework further comprised of an inner frame track 78 extending longitudinally around the right side 84 and top portion 86 of said inner frame track 78, the right side 84 and the top portion 86 of the inner frame track 78 housing a negative magnetic rod 86 for latching onto the positive magnetic border 58 of said retractable screen 22. The inner frame track 78 is configured to fit into the top portion 64 of the doorframe housing 72. The positive magnetic border 58 and the bottom portion of the screen 59 are supported in the inner frame track 78 during the relative movement of the retractable screen 22 when the retractable screen 22 is moved into forward and backward positions. The positive magnetic border 58 slidably fit in interlocking relation with the negative magnetic rod 96 whereby the positive magnetic border 58 is a guide means for guiding the retractable screen 22 during the horizontal movement by the window 68 and screen closure mechanism 54. The magnetic positive force of the positive magnetic border 58 enhances the function and movement of the screen. It utilized the standard principles of magnetic force to facilitate the movement of the screen towards the negative magnetic rod 96 provided in the inner frame track 78. The inner frame track 78 cooperating with the respective side edges of the retractable screen 22 as the retractable screen 22 is moved within the inner track frame 78. The retractable screen 22 having the side edges fixed entirely in the inner frame track 78 once the screen is deployed horizontally. The retractable screen 22 remains unobstructed by the window opening 76 such that along essentially along its entire path of movement the retractable screen 22 and the window 68 are parallel and spaced away from the their respective surfaces thereby avoiding contact and resistance to the upward movement as the window 68 and the retractable screen 22 are moved to fully deployed positions. The opening 76 for the window 68 and the inner frame track 78 are non-intersecting to facilitate the movement of the window 68 and the retractable screen 22 and securing the window 68 and the retractable screen 22 in a separate disposition in the doorframe 62. The retractable screen 22 having its bottom portion 59 fixed entirely in the inner frame track 78 once the retractable screen 22 is moved.

In practice, the retractable screen cartridge 28 is connected to the reel motor 52 while the bottom portion 59 of the retractable screen 22 is inserted horizontally through the inner frame track 78 and is horizontally movable within the inner frame track 78 by means of the window and screen closure mechanism 54. The window and screen closing mechanisms 54 having electric motors 98 to actuate the reel motor 52 and open and close the retractable screen 22. The window and screen closure mechanism 54 having a control switch for establishing the reeling end limits of the retractable screen 22. The window and screen closure mechanism 54 being controlled by a master control switch and a plurality of individual control switches 102 that are connected to a control box of the vehicle 20. The master control switch individually controls the window 68 and the retractable screen 22 from the driver seat of the vehicle 20 and wherein the plurality of individual control switches 102 control the window 68 and the retractable screen 22 from additional seating areas in the vehicle 20. The driving mechanism opens the window 68 and the retractable screen 22 by the standard rotational movement of the motor 52. The driving mechanism closing the retractable screen 22 by the standard reverse rotational movement of the motor 52. The window and screen closure mechanism 54 may also be used to brake or otherwise control the rotational speed of reel-mounting hub 34.

The screen storage reel 24 is disposed within the screen cartridge 28 and is quickly attachable and detachable according to the specific needs of the user. The interior housing 26 of the screen cartridge 28 providing a pocket that is sufficiently sized to accept the screen storage reel 24 and allow the user to quickly adjust the retractable screen 22 as needed for deployment.

The improved retractable screen 22 and doorframe assembly 10 can be formed in a shape that is adjusted to accommodate any existing doorframe 62. This system is provided with an improved retractable screen 22 and doorframe assembly 10 having the capacity for concurrent use and providing a barrier that can possible prevent pets from escaping the vehicle 20. In a preferred embodiment, the system can be used to respond to an increase in the interior temperature of the vehicle 20 by manually lowering the glass and activating the retractable screen 22. The retractable screen 22 allows air to circulate inside of the vehicle 20 while at the same time address the need for the safety of its occupants.

Several types of vehicles 20 having a plurality of window placements can be produced using the inventive concept provided herein. The doorframe arrangement systems for a wide variety of vehicles 20 can be constructed or changed to include this novel window and screen arrangement. For example, the frame of a vehicle sunroof can be adjusted to accommodate the assembly 10 as prescribed herein. These vehicles 20 can include various styles of automobiles and the system can be assembled and manufactured at moderate cost and readily attached to most doorframes in the field or at a manufacturing site. Additionally, the motorized movement mechanisms can be strategically placed and adjusted alongside any seating arrangement in a vehicle 20. It can be placed in any vehicle 20 that is predominantly used for carrying passengers or centrally placed for controlling any window 68 and screen arrangement as described herein.

The retractable screen 22 of the present construction can be produced in an infinite number of colors and designs to reflect the personal tastes and desires of the manufacturer or users. Notably, additional elements such as logos, sports memorabilia, and reflective materials can be applied when the retractable screen 22 is constructed. The retractable screen 22 can be intermixed between various decorative patterns, knitting, and shape designs of materials typically used to construct the same.

Although the invention has been explained in relation to its preferred embodiment, it is to be understood that many other possible modifications and variations can be made without departing from the spirit and scope of the invention.

What is claimed is:

1. A retractable screen and doorframe assembly for a vehicle, the assembly comprising a retractable screen;
   said retractable screen being releasably placed on a screen storage reel placed within an interior housing of a screen cartridge having an exterior cover, and a reel-mounting hub, said screen storage reel being provided with a drum portion having a first and a second end, a first opposing disc, and a second opposing disc being secured to the first and second ends of said drum portion, respectively, and each of said first opposing disc and said second opposing disc having outer ends with apertures being provided therein, and said screen storage reel being unitarily insertable in said interior housing of said screen cartridge and being removable from said interior housing of said screen cartridge;

said reel-mounting hub having a reel motor configured to be electrically connected to a vehicle window and screen closure mechanism and actuated by said window closure mechanism to rotate said drum portion of said screen storage reel, said reel-mounting hub having a freely rotatable top drive portion for releasably securing said screen storage reel thereto, said screen storage reel being rotatably mounted on said reel-mounting hub by snapping said first opposing disc into said top drive portion of said reel-mounting hub, whereby said reel-mounting hub is capable of rotating said screen storage reel in forward and backward rotational directions;

said retractable screen being constructed from screen material, having side edges, and a rigid upper edge with a positive magnetic border and a bottom portion;

and the retractable screen being movable within an inner frame track configured to fit into a window opening of vehicle and having a left side portion, a right side portion, a top portion and a bottom portion, said left side portion having an opening for receiving said retractable screen, and said inner frame track having a plurality of axially connected wheel sets being dispensed inside said bottom portion of said inner frame track for slidably receiving and moving said bottom portion of said retractable screen, and said top portion of said inner frame track housing a negative magnetic rod for slidably latching onto said positive magnetic border of said retractable screen, wherein said positive magnetic border and the axially connected wheel sets are configured to guide said retractable screen during the horizontal movement.

2. The retractable screen and doorframe of claim 1, wherein a strength of the positive magnetic border is about 750 gauss.

3. The retractable screen and doorframe of claim 1, wherein said interior housing provides a pocket within which said retractable screen is housed when not in use.

4. The retractable screen and doorframe of claim 1, wherein said retractable screen is configured to open independently of opening and closing a window controlled by the window closing mechanism.

5. A retractable screen and door frame assembly for a vehicle, the assembly comprising:

a retractable screen having a lower edge and an upper edge, said upper edge comprising a positive magnetic border;

said retractable screen being releasably placed on a screen storage reel placed within an interior housing of a screen cartridge, said screen cartridge having an exterior cover and a reel mounting hub, said reel mounting hub having a reel motor configured to be electrically connected to a window closure mechanism of a vehicle; and an inner frame track configured to be attached within a vehicle window opening, and comprising a top portion and a bottom portion, said bottom portion comprising a set of axially connected wheels, and said top portion comprising a negative magnetic rod;

wherein the reel motor is configured to be actuated by the window closure mechanism, whereby said retractable screen is released from said storage reel to extend horizontally, the lower edge of the retractable screen is guided by the axially connected wheel set of said bottom portion of said inner frame and said positive magnetic border of said upper edge of said screen magnetically connects with the negative magnetic rod of said top portion of said inner frame track.

6. The retractable screen and door frame assembly of claim 5, wherein the screen storage reel has a rotatable drum portion having a first and a second end, and a first opposing disc and a second opposing disc being secured to said first and second ends respectively, and said screen storage reel being configured to be rotatably mounted from either the first or the second end to the reel mounting hub such that when the reel motor of the reel mounting hub is actuated the retractable screen is released or retracted depending on rotation direction of the drum.

7. The retractable screen and door assembly of claim 5, wherein the screen is fiberglass screen, no-see-um screen, improved visibility screen, pet screen, solar screen, or insect screen.

8. The retractable screen and door assembly of claim 5, wherein wheels of the wheel set are engaged in vibratory movement to horizontally convey the screen across the bottom portion of the inner frame track.

9. The retractable screen and door assembly of claim 5, wherein the positive magnetic border of the retractable screen has a strength of about 750 gauss.

* * * * *